(12) United States Patent
Issler et al.

(10) Patent No.: US 8,167,496 B2
(45) Date of Patent: May 1, 2012

(54) SLIDE BEARING

(75) Inventors: Wolfgang Issler, Schwaikheim (DE); Theo Mossmann, Schifferstadt (DE)

(73) Assignee: MAHLE International GmbH, Stuttgart (DE)

( * ) Notice: Subject to any disclaimer, the term of this patent is extended or adjusted under 35 U.S.C. 154(b) by 316 days.

(21) Appl. No.: 12/590,006

(22) Filed: Oct. 30, 2009

(65) Prior Publication Data

US 2010/0111455 A1    May 6, 2010

(30) Foreign Application Priority Data

Nov. 6, 2008 (DE) .......................... 10 2008 056 202

(51) Int. Cl.
*F16C 33/24*    (2006.01)

(52) U.S. Cl. ........................................ 384/283; 384/282

(58) Field of Classification Search ............... 384/283, 384/282, 294, 429, 907
See application file for complete search history.

(56) References Cited

U.S. PATENT DOCUMENTS

| | | | | |
|---|---|---|---|---|
| 2,268,869 | A | * | 1/1942 | Given ........................... 384/283 |
| 3,436,129 | A | * | 4/1969 | James ............................. 384/36 |
| 4,571,112 | A | * | 2/1986 | Johnson et al. ............... 384/283 |
| 7,575,814 | B2 | | 8/2009 | Adam et al. |
| 2006/0263000 | A1 | | 11/2006 | Bock et al. |

FOREIGN PATENT DOCUMENTS

| | | |
|---|---|---|
| DE | 103 37 030 | 3/2005 |
| DE | 10 2004 028 773 | 1/2006 |
| DE | 10 2007 044 249 | 3/2009 |
| EP | 1 722 116 | 11/2006 |

* cited by examiner

*Primary Examiner* — Thomas R Hannon
*(74) Attorney, Agent, or Firm* — Collard & Roe, P.C.

(57) ABSTRACT

A slide bearing has at least one bearing shell for accommodating a component to be supported. The at least one bearing shell has two grooves that run in the circumference direction on its slide surface, into which grooves guide elements for lubricant are laid. The grooves and/or the guide elements have at least one holding element.

16 Claims, 3 Drawing Sheets

SLIDE BEARING

CROSS REFERENCE TO RELATED APPLICATIONS

Applicants claim priority under 35 U.S.C. 119 of German Application No. 10 2008 056 202.5 filed Nov. 6, 2008.

BACKGROUND OF THE INVENTION

1. Field of the Invention

The present invention relates to a slide bearing having at least one bearing shell for accommodating a component to be supported. The bearing shell has two grooves that run in the circumference direction on its slide surface, into which grooves guide elements for lubricant are laid.

2. The Prior Art

A slide bearing of this type is described in German Patent No. DE 10 2004 028 773 B4 and European Patent Application No. EP 1 722 116 A1. This slide bearing is equipped with expansion or throttling elements, in order to control the size of the bearing gap between the bearing shell and the surface of the component to be supported, and to prevent excessive discharge of lubricant.

SUMMARY OF THE INVENTION

It is an object of the present invention to further develop a slide bearing of the type stated, in such a manner that a simplified structure and simplified handling are achieved, together with a reliable effect.

This object is accomplished according to the invention by a slide bearing having at least one bearing shell for accommodating a component to be supported, the bearing shell having two grooves that run in the circumference direction on its slide surface. Guide elements for lubricant are laid into the grooves. The grooves and/or the guide elements have at least one holding element.

Therefore, the guide elements are merely laid into the grooves during assembly, and held with a clamping effect, by means of the at least one holding element, i.e. with force fit. Surprisingly, it has been shown that the guide elements are reliably held even in operation or under great stress, and achieve the desired effect, i.e. controlling the size of the bearing gap and thus the discharge of lubricant. Since no additional aids or measures are required, according to the invention, in order to lay the guide elements into the grooves and hold them in the grooves, the slide bearing according to the invention also has a particularly simple structure and can be easily assembled.

In a preferred embodiment, the guide element has at least one lateral thickened region as a holding means, which thickened region can be configured in the shape of a flattened spherical dome or flattened cylindrical dome. The shape and the arrangement of the lateral thickened region, or of two or more lateral thickened regions, can be freely selected and are determined by the requirements in an individual case. For example, at least two lateral thickened regions in the shape of a flattened spherical dome or flattened cylindrical dome can lie opposite one another, over the length of the guide element, or can be disposed offset relative to one another, or can be disposed at one end of the guide element, lying opposite one another. The at least one lateral thickened region can be formed on in a particularly simple manner during production of the guide elements, and ensures a reliable force-fit hold of the guide element in the groove.

In another embodiment, the guide elements for forming the holding means have a wave shape or an arc shape, which can also be formed into the guide elements during production. The wave shape or arc shape, as an integral holding means that is easy to produce, also brings about secure hold of the guide element in the groove.

In another embodiment, the holding means is formed by at least one lateral bore in the guide element and a cam in the groove that corresponds to the at least one bore. In this way, a shape-fit hold of the guide element in the groove can be achieved in a particularly simple manner.

If the holding means according to the invention is provided in the grooves, each groove can have at least one constriction over its length, as a holding means, which can be configured, for example, as a dome formation of the side walls of the groove. Such structures can be formed in a simple manner when the groove is worked into the bearing shell.

As an alternative, each groove has at least one stamped region on the groove edge, which projects into the interior of the groove, as a holding means. The stamped region can easily be made in the groove edge, and represents a particularly simple but effective holding means with which the guide element is held in the groove, in a clamped manner. The placement of the stamped region or of two or more stamped regions can be freely selected and is determined by the requirements of an individual case. For example, at least two stamped regions can be disposed over the length of the guide element, lying opposite one another or offset from one another, or can be disposed at one end of the guide element, lying opposite one another.

The guide elements can end flush with the slide surface of the bearing shell, and can develop their effect by thermal expansion, in operation. However, at least one section of the guide elements can also project radially beyond the slide surface of the bearing shell, so that no thermally expandable material is required for the guide elements.

It is advantageous if the guide elements have at least one guide groove for lubricant, at least in their surface that faces the component to be supported, in order to counter the lubricant that is flowing away with additional flow resistance. If the at least one guide groove is configured to run around the circumference in spiral shape, it is possible to convey the exiting lubricant back into the slide bearing. The guide elements preferably consist of a polymer material.

The grooves can run parallel to one another, as usual, or can be disposed to converge toward one another over at least part of the circumference of the slide surface. In the latter case, the distance between the guide elements, relative to one another, is reduced over at least part of the circumference of the slide surface. From this, an oil stream results between the guide elements, in terms of flow physics, which stream flows at an increasingly greater speed. As a result, the pressure build-up in the elastodynamic contact is improved, and thus the ability of the slide bearing according to the invention to withstand stress is increased, i.e. the danger of seizing is reduced.

In order to optimize the lubricant flow influenced by the guide elements, the grooves and the guide elements are preferably disposed in the direction of rotation of a component to be supported, which rotates during operation. A further optimization can be achieved if two bearing shells are provided and the grooves and the guide elements are disposed in the bearing shell that is subject to less stress during operation. By means of these two measures, improved stress relief of the bearing shell subject to greater stress can be achieved, in particular.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 4a shows a section along the line IVa-IVa in FIG. 3a;

DETAILED DESCRIPTION OF THE PREFERRED EMBODIMENT

Figure 1:
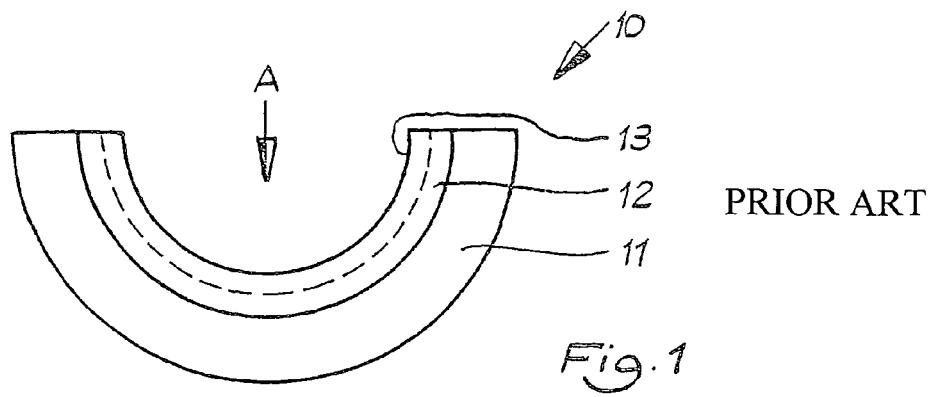
FIG. 1 shows a front view of a bearing shell of a slide bearing.
Figure 2:
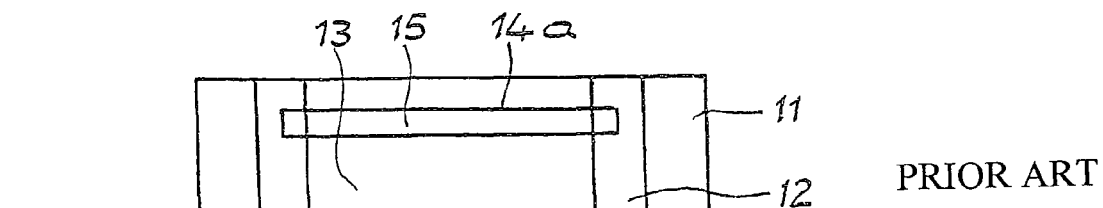
FIG. 2 shows a top view of the bearing shell according to FIG. 1, in the direction of the arrow A in FIG. 1.

Referring now in detail to the drawings, FIGS. 1 and 2 show a usual bearing shell 10 for a slide bearing. The structure of slide bearings is known and has been described, for example, in German Patent Application No. DE 103 37 030 A1, the disclosure of which is herein incorporated by reference. A slide bearing generally consists of a layer composite that is shown in FIG. 1, for reasons of clarity, as a uniform carrier layer 11, and ends, in the direction of the component to be supported, with a slide layer 12 that has a slide surface 13. Slide surface 13 is provided, along its circumference, with two grooves 14a, 14b that run in the circumference direction, in which groove guide elements 15 are accommodated. Guide elements 15 consist of a polymer material, for example on the basis of polytetrafluoroethylene, and have a cross-section that corresponds with the cross-section of the grooves 14a, 14b. In general, guide elements 15 are laid into grooves 14a, 14b in such a manner that the surfaces of guide elements 15 end flush with slide surface 13. Guide elements 15 therefore develop their effect in lubricant control by thermal expansion during operation of the slide bearing.

FIGS. 3a to 4b show exemplary embodiments of different guide elements 15a, 15b, 15c, 15d for a bearing shell 10 according to FIGS. 1 and 2 of a slide bearing according to the invention. Guide elements 15a, 15b, 15c, 15d are thus intended for use in a conventionally structured bearing shell 10.

Figure 3A:
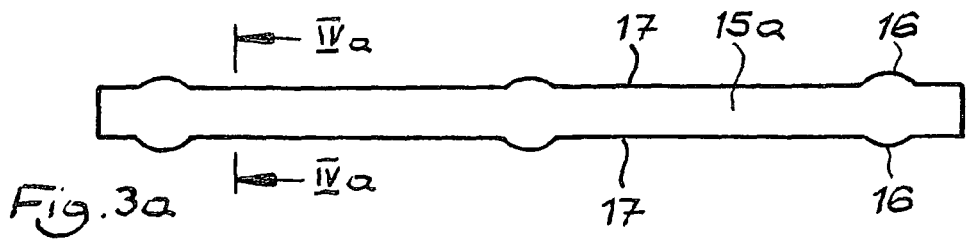
FIGS. 3a-3d shows exemplary embodiments of four guide elements provided with holding means.
Figure 4A:
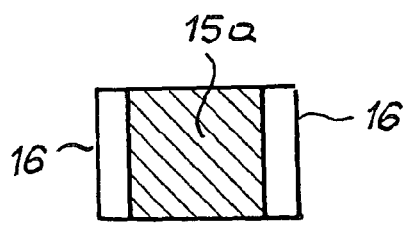

Guide element 15a according to FIG. 3a has a total of six lateral thickened regions 16 in the exemplary embodiment. As can be seen in FIG. 4a, guide element 15a is essentially square in cross-section. Thickened regions 16 are formed on, in one piece, onto side surfaces 17 of guide element 15a, and have a contour approximately in the shape of a cylindrical flattened spherical dome. In the exemplary embodiment, thickened regions 16 are disposed in pairs, lying opposite one another, and are uniformly distributed over the length of guide element 15a. In the assembled state, side surfaces 17 lie against the side walls of groove 14a or 14b, respectively, so that thickened regions 16 bring about a force-fit hold of guide element 15a in groove 14a or 14b, on the basis of their elastic deformation.

Figure 3B:
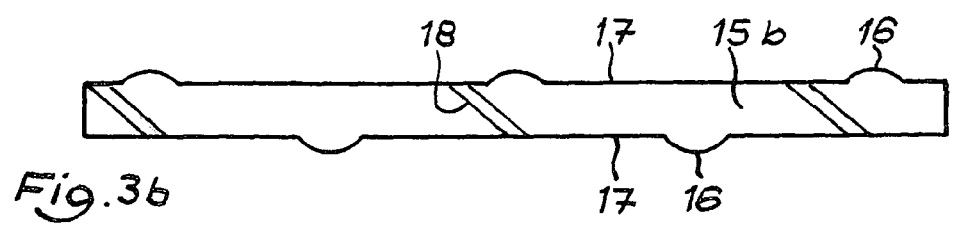

Guide element 15b according to FIG. 3b is provided with five lateral thickened regions 16, as they were already described for guide element 15a according to FIG. 3a. Lateral thickened regions 16 are disposed offset from one another and uniformly distributed over the length of guide element 15b. Guide element 15b additionally has a circumferential guide groove 18 that runs in spiral shape. Guide groove 18 brings about the result that an additional flow resistance counters the lubricant that is flowing away. Furthermore, because of the spiral-shaped configuration of guide groove 18, it is possible to convey the exiting lubricant into the slide bearing.

Figure 3C:
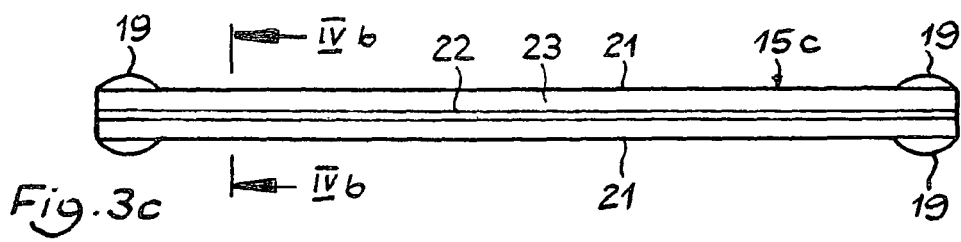
Figure 4B:
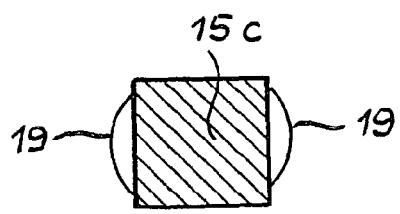
FIG. 4b shows a section along the line IVb-IVb in FIG. 3c.

Guide element 15c according to FIG. 3c is provided with a total of four lateral thickened regions 19. As can be seen in FIG. 4b, guide element 15c is essentially square in cross-section. Lateral thickened regions 19 are formed, in one piece, onto side surfaces 21 of guide element 15c, and have a contour approximately in the shape of a flattened spherical dome. In the exemplary embodiment, lateral thickened regions 19 are disposed at the free ends of guide element 15c, lying opposite one another in pairs. In the assembled state, side surfaces 21 lie against the side walls of grooves 14a or 14b, respectively, so that thickened regions 19 bring about a force-fit hold of guide element 15c in groove 14a or 14b, because of their elastic deformation. Guide element 15c furthermore has a straight guide groove 22 that extends over its entire length. Guide groove 22 is made in surface 23 of guide element 15c that faces the component to be supported in the assembled state. Guide groove 22 brings about the result that an additional flow resistance counters the lubricant that is flowing away.

Figure 3D:
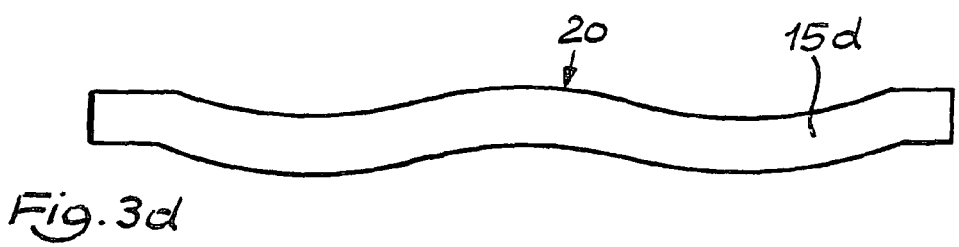

Guide element 15d according to FIG. 3d has a wave shape 20 over its entire length. This wave shape 20 represents an integral holding means and can be formed in a simple manner during production of guide element 15d. Wave shape 20 brings about a force-fit hold of guide element 15d in grooves 14a, 14b of bearing shell 10, since guide element 15d alternately lies against the side walls of groove 14a or 14b, under bias. It is practical if the deviations from the center axis of guide element 15d amount to 0.1 to 0.3 mm. Instead of the wave shape, an arc shape (not shown) can also be used.

Figure 5:
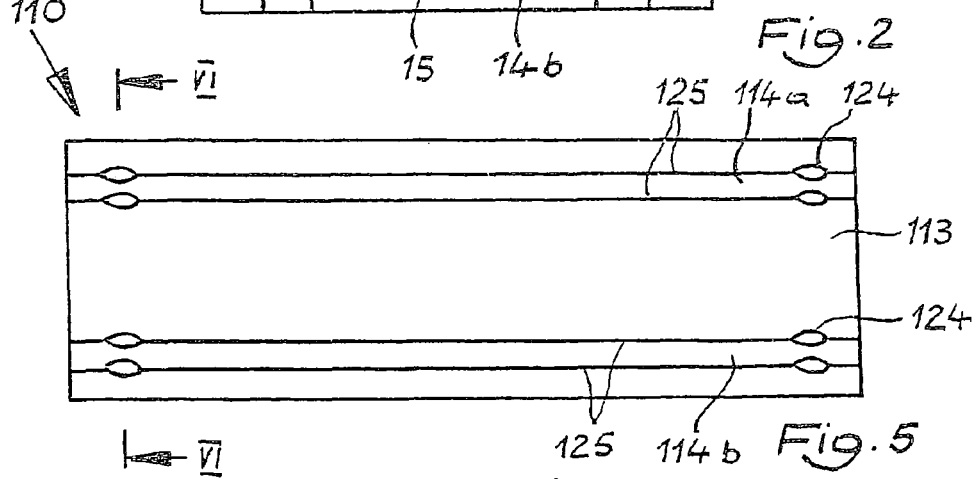
FIG. 5 shows a first exemplary embodiment of a bearing shell having a structure according to FIG. 1, in a developed view, for a slide bearing according to the invention.
Figure 6:
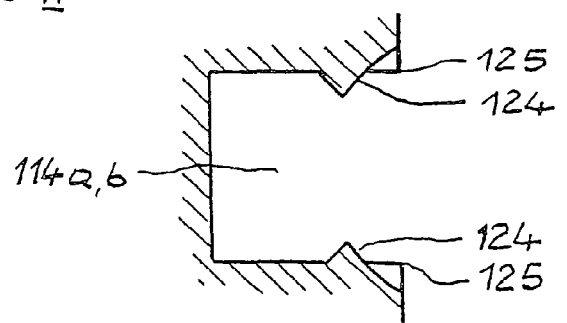
FIG. 6 shows a section along the line VI-VI in FIG. 5.

FIGS. 5 and 6 show a bearing shell 110 that has a structure the same as bearing shell 10 according to FIGS. 1 and 2. FIG. 5 shows a developed view of bearing shell 110, while FIG. 6 shows a sectional view. Grooves 114a, 114b made in slide surface 113 of bearing shell 110 have two stamped regions 124 that lie opposite one another, in the region of each of their ends. Stamped regions 124 are made in edges 125 of grooves 114a, 114b, in such a manner that they project into the interior of groove 114a or 114b, respectively. It is practical if they are made after machining of groove 114a or 114b, and before final machining of slide surface 113, for example by means of a stamp. Guide elements are introduced into grooves 114a, 114b, which in themselves do not have to have any holding means. The guide elements are held between bottom 126 of groove 114a or 114b, respectively, and stamped regions 124, with a clamping effect.

Figure 7:
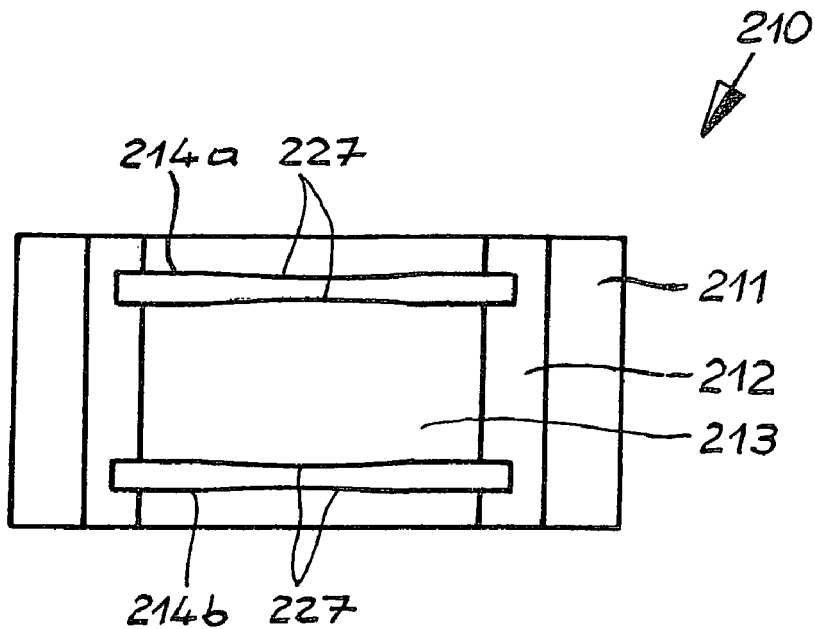
FIG. 7 shows another exemplary embodiment of a bearing shell of a slide bearing according to the invention, in a top view.

FIG. 7 shows another embodiment of a bearing shell 210 in a top view. The structure, with carrier layer 211, slide layer 212, and slide surface 213, corresponds to that of bearing shell 10 according to FIGS. 1 and 2. Grooves 214a, 214b are made in slide surface 213, which grooves have a constriction 227, in each instance, as a holding means. Constriction 227 brings about narrowing of groove 214a or 214b, for practical purposes up to 10% of the groove width. Of course, two or more constrictions can also be provided. In the exemplary embodiment, constriction 227 is configured as a dome formation of the two side walls of each groove 214a, 214b, which can be formed along with the groove, when groove 214a or 214b is made in slide surface 213. Instead, constriction 227 can also be produced by material application, or by cutting machining, such as milling, for example. Of course, it is also possible to machine only one side wall of each groove 214a, 214b accordingly. Guide elements that do not have to have any holding means themselves are introduced into grooves 214a, 214b. The guide elements are held in constrictions 227, with a clamping effect. In heat-stressed operation, because of the thermal expansion of the material of the guide element, it grows radially out of groove 214a or 214b, respectively, to a greater extent, and thus it is pressed more strongly against the component to be supported.

Figure 8A:
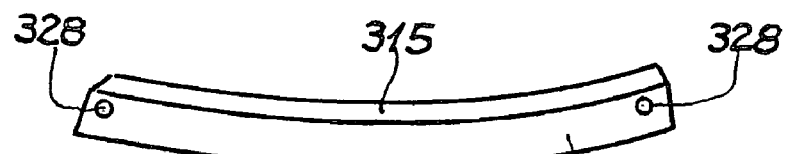
FIG. 8a shows another exemplary embodiment of a guide element for a slide bearing according to the invention, in a perspective view.
Figure 8B:
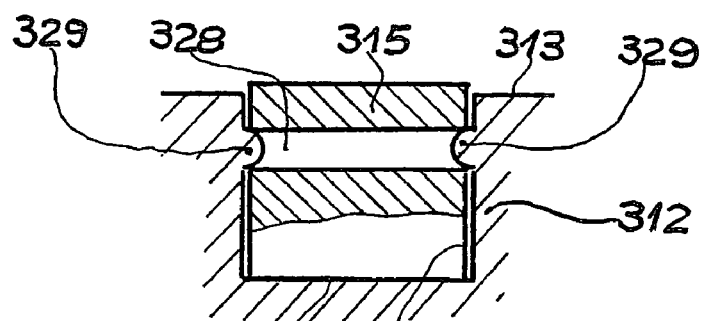
FIG. 8b shows another exemplary embodiment of a bearing shell having a guide element according to FIG. 8a inserted into it, in section.

FIGS. 8a and 8b show another embodiment of a guide element 315 and a bearing shell for a slide bearing according to the invention. Guide element 315 has a square or rectangular cross-section in the exemplary embodiment, and has bores 328 on its side surfaces 317. Bores 328 are provided at the free ends of guide element 315. Grooves 314 are made in slide surface 313 of slide layer 312 of the bearing shell that corresponds to guide element 315, which grooves have four cams 329, as holding means, in their side walls. Cams 329 are provided in pairs, corresponding to bores 328 in guide element 315, at the ends of grooves 314, and can be formed in during production of the bearing shell, i.e. of grooves 314, by means of material application or by cutting machining, such as milling, for example. In the assembled state (see FIG. 8b), side surfaces 317 of guide element 315 lie against the side walls of groove 314, in such a manner that cams 329 of groove 314 engage into bores 328 in guide element 315, forming a catch, and bring about a shape-fit hold of guide element 315 in groove 314. Of course, in principle, one cam per guide element is sufficient to secure the guide element in the groove.

If two bearing shells form a slide bearing for a component to be supported, which rotates during operation, for example a crankshaft, it is recommended to dispose the grooves, and therefore the guide elements, in the direction of rotation of the component, specifically preferably in the bearing shell that is subject to less stress. If the two grooves and thus the guide elements are disposed to at least partially converge relative to one another, improved stress relief of the bearing shell that is subject to greater stress and lies on the opposite side is achieved, in that an oil flow at greater speed is produced for this bearing shell, which flow improves a pressure buildup in the elastohydrodynamic contact, and thus increases the ability of this bearing shell to withstand stress, i.e. reduces the risk of seizing.

Accordingly, while only a few embodiments of the present invention have been shown and described, it is obvious that many changes and modifications may be made thereunto without departing from the spirit and scope of the invention.

What is claimed is:

1. A slide bearing comprising:
   at least one bearing shell for accommodating a component to be supported, the bearing shell having two grooves that run in a circumference direction on a slide surface of the bearing shell;
   guide elements for lubricant disposed in the grooves; and
   at least one holding element connected to the guide elements or grooves for holding the guide elements in the grooves.

2. The slide bearing according to claim 1, wherein the holding element comprises at least one lateral thickened region on at least one of the guide elements.

3. The slide bearing according to claim 2, wherein the at least one lateral thickened region is configured in the shape of a flattened spherical dome or flattened cylindrical dome.

4. The slide bearing according to claim 2, wherein there are at least two lateral thickened regions disposed over the length of the guide element, lying opposite one another or offset from one another.

5. The slide bearing according to claim 2, wherein there are at least two lateral thickened regions disposed at one end of the guide element, lying opposite one another.

6. The slide bearing according to claim 1, wherein the guide element has a wave shape or arc shape that forms the holding element.

7. The slide bearing according to claim 1, wherein the holding element is formed from at least one lateral bore in the guide element and a cam in the groove that corresponds to the bore.

8. The slide bearing according to claim 1, wherein the holding element is formed by at least one constriction in the groove.

9. The slide bearing according to claim 8, wherein the at least one constriction is formed as a dome formation of a side wall of the groove.

10. The slide bearing according to claim 1, wherein the holding element is formed by a stamped region of a groove edge that projects into an interior of the groove.

11. The slide bearing according to claim 10, wherein there are at least two stamped regions disposed at one end of the groove, lying opposite one another.

12. The slide bearing according to claim 1, wherein the guide elements have a guide groove for lubricant, at least in their surfaces that face the component to be supported.

13. The slide bearing according to claim 1, wherein the guide elements consist of a polymer material.

14. The slide bearing according to claim 1, wherein the grooves run parallel to one another or converge toward one another, at least over part of a circumference of the slide surface.

15. The slide bearing according to claim 1, wherein the grooves and the guide elements are disposed in a direction of rotation of a component to be supported, which rotates during operation.

16. The slide bearing according to claim 1, wherein two bearing shells are provided, and the grooves and the guide elements are provided in the bearing shell that is subject to less stress during operation.

* * * * *